Figure 1:
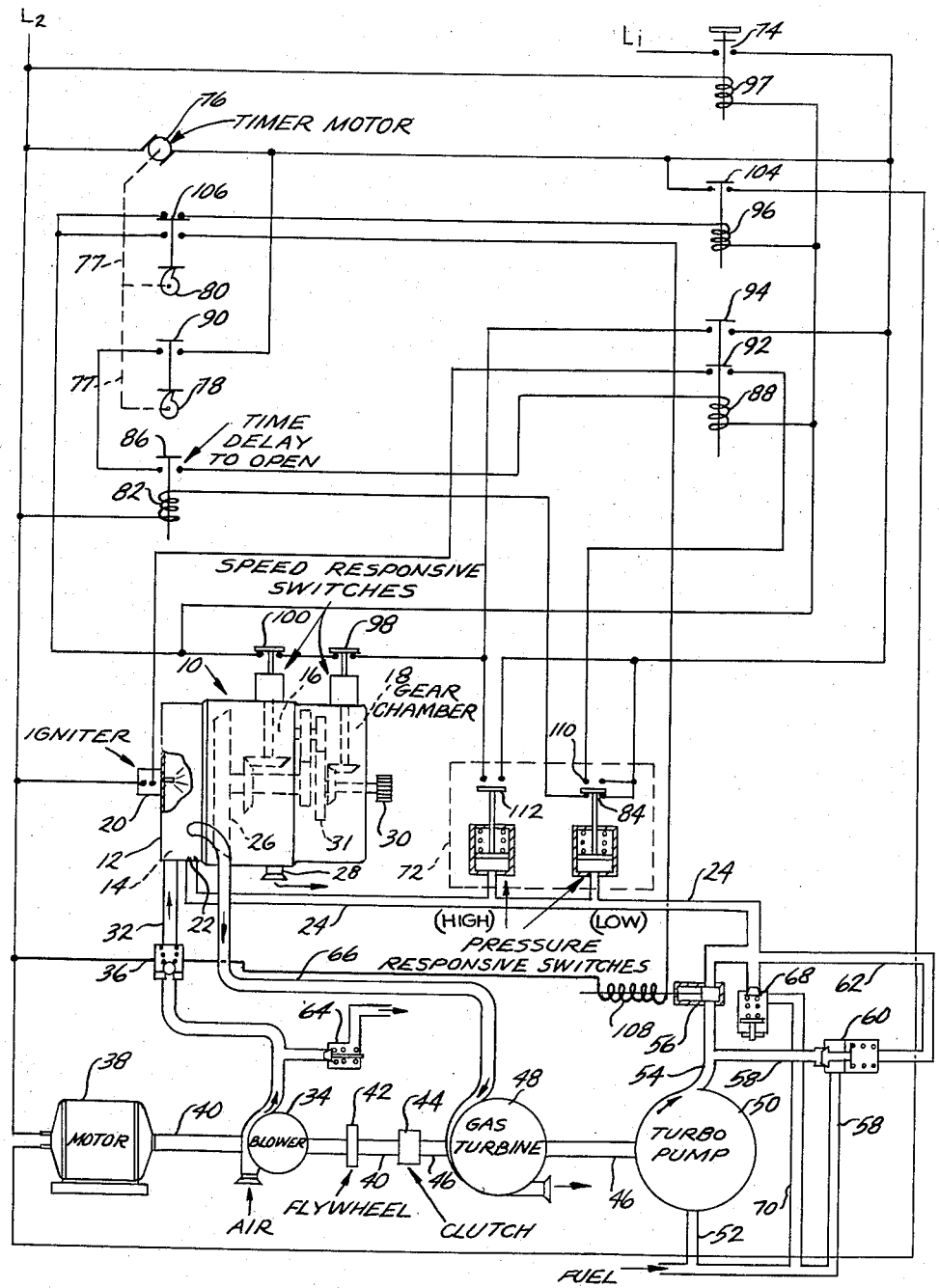

INVENTOR.
EARL K. MOORE

United States Patent Office 2,924,935
Patented Feb. 16, 1960

2,924,935

FUEL SUPPLY FOR GAS GENERATOR

Earl K. Moore, Granby, Conn., assignor to United Aircraft Corporation, East Hartford, Conn., a corporation of Delaware Application April 9, 1956, Serial No. 576,878

8 Claims. (Cl. 60—39.14)

This invention relates to an improved gas generator and fuel control system therefor. It is believed that the improved gas generator provided in accordance with this invention can be used to advantage in many applications where it may be combined with various elements and mechanisms. One installation wherein the generator may be used to particular advantage is in the construction of a gas-operated or combustion starter for an aircraft engine or other engine.

A major problem connected with the use of gas-operated or combustion starters has been the supply of adequate electrical power for starter operation. The electrical power supply requirements for gas-operated starters on aircraft engines in particular have been so great in many cases as to necessitate the use of external batteries or generators to avoid exhausting the aircraft electrical power supply. In some cases even the remote or external supply may be inadequate, particularly if the external source is a battery and the ambient temperature is low.

It is a general object of the invention to provide a gas generator wherein the fuel supply can be provided efficiently while minimizing the energy requirement, as from electrical means, for the fuel supply.

Another general object of the invention is to provide a gas-operated engine starter, particularly for aircraft, which minimizes the electrical power requirements for starter operation so as to make it possible for engine operation to be started without resorting to sources of electrical energy remote from the aircraft even if starter operation must be repeated several times before engine operation commences.

Another and more specific object of the invention is to provide a combustion starter which does not require electrical energy to pump the fuel to the starter during the entire period or cycle of starter operation.

A further object of the invention is to provide a combustion starter and control system therefor which is fully automatic, requiring only that a start switch be closed to commence operation of the starter for a timed cycle and which control system will stop operation of the starter at the end of the cycle whether or not the engine has started self-sustaining operation. In this connection, it will be found that a starter provided in accordance with the present invention avoids the dangers and liabilities of malfunction generally associated with combustion starters.

Other objects of the invention, as well as the advantages thereof, will become apparent from the following description taken with reference to the attached drawing wherein, by way of preferred example only, one specific embodiment of the invention is disclosed. It will be ascertained from the claims forming a part of this specification that the invention has greater scope than may be indicated by the drawing and description of the one specific embodiment and, therefore, the said drawing and description are not to be taken in a limiting sense.

Figure 2:
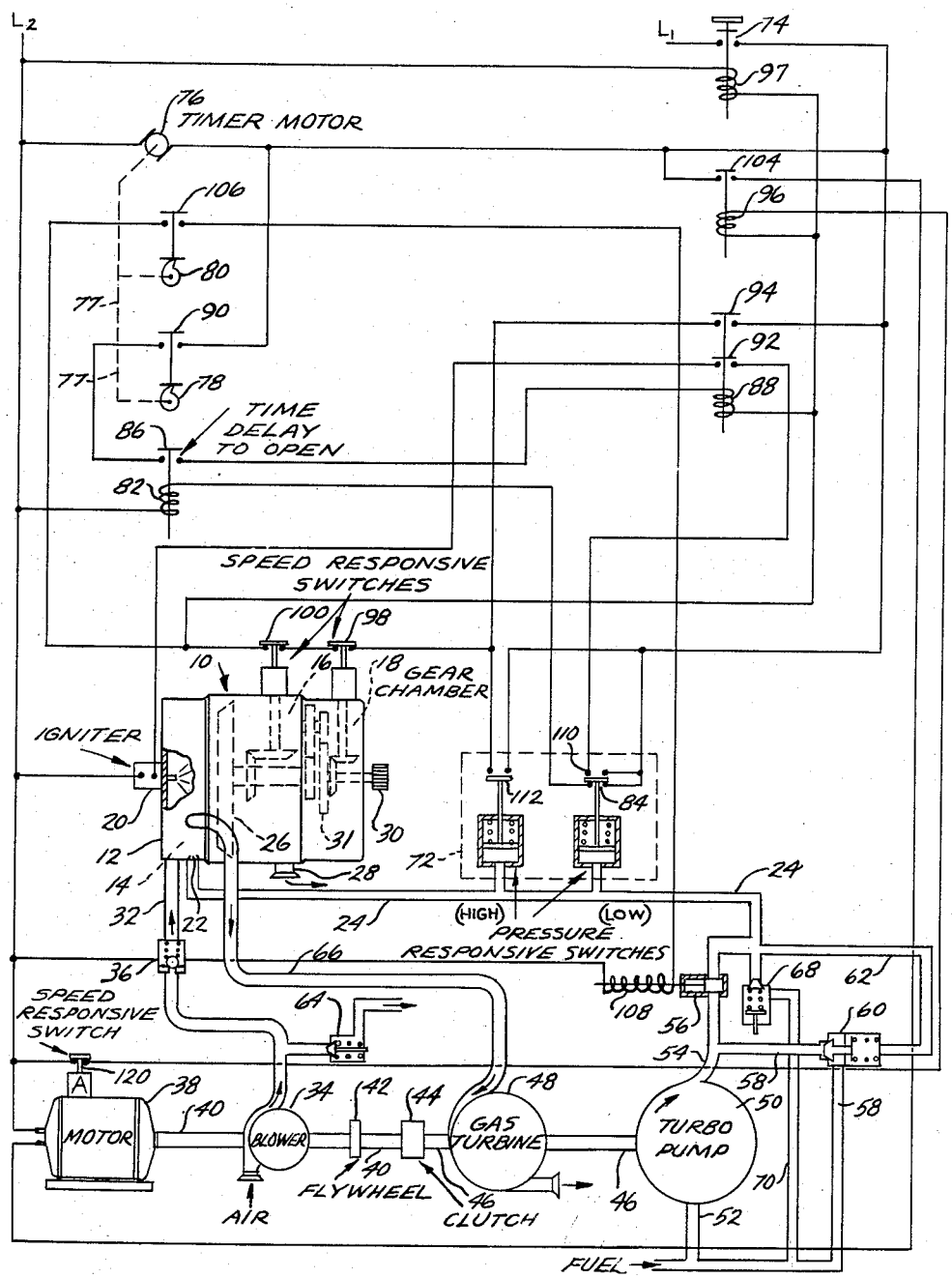

In the drawing:

Fig. 1 is a schematic view of the starter and combustion control apparatus associated therewith and includes a wiring diagram of an electrical control system employed to control starter operation; and Fig. 2 is a schematic view of the starter and control apparatus similar to Fig. 1, but showing an alternative arrangement of the electrical control system.

A combustion starter such as may be employed to start operation of a jet engine or the like is indicated generally by the reference numeral 10. The starter 10 may comprise a housing 12 wherein there is defined a turbine chamber 16 and a gear chamber 18. A combustion chamber 14 also can be defined within the housing 10 as shown, but in most cases it will be preferable to provide a detachable housing defining the combustion chamber. An igniter or spark plug 20 is supported by the housing 12 to ignite a combustible fuel within the combustion chamber 14, the fuel being introduced thereto through an orifice 22 at the end of a fuel line or conduit 24. The gases of combustion provide the propellant driving a turbine 26 within the chamber 16 and then the gases are exhausted from the turbine chamber 16 through an outlet 28. The turbine 26 drives a starter output shaft 30 which can be connected with the engine to be started, the turbine being connected with the shaft 30 through reduction gearing 31 disposed within the gear chamber 18. It should be understood that the housing defining the combustion chamber 14 comprises a gas generator which may be used for apparatus other than the turbine, etc. In fact, the said gas generator in itself comprises an independent rocket motor.

It has been found desirable to use a "monofuel" in the combustion chamber. A "monofuel" is one which decomposes and then burns to create the gases of combustion. The fuel may be ignited by oxidation and then be left to decompose and burn. Accordingly, the igniter 20 is excited or energized only at the beginning of starter operation. It should be understood that heat and pressure generated other than by oxidation will also initiate decomposition and, therefore, other igniting and initiating means can be used.

Before the monofuel, such as propyl nitrate, is introduced to the combustion chamber 14 and ignited therein, the said combustion chamber is purged with air. Air is introduced to the combustion chamber 14 through an inlet communicating with a conduit 32 extending from a blower 34. A check valve 36 is disposed within the conduit 32 to permit air to be introduced to the combustion chamber 14 under pressure but to prevent air or gases of combustion from escaping the combustion chamber through the conduit 32.

The blower 34 is driven by an electric motor 38 connected to the blower 34 by a drive shaft 40. The shaft 40 also extends to a flywheel 42 and a clutch 44 which makes a one-way driving conection between the shaft 40 and a driven shaft 46 extending from a turbine 48. The turbine shaft 46 also extends to a fuel pump 50. The motor 38 is a low horsepower motor (a fractional horsepower motor will satisfy the requirements of most installations) which is energized to drive the blower 34, the flywheel 42, the turbine 48 and thus the pump 50 until the said blower, etc. reach a desired operating speed. During acceleration of the blower, turbine and pump to the desired operating speed, which will take a determinable time period, as for example, approximately 3 to 5 seconds, the blower 34 forces air into the starter combustion chamber 14 to purge the same of undesirable gases. During the acceleration period, the turbine driven pump 50 withdraws the propyl nitrate fuel from a source through a conduit 52 and discharges the same through a conduit 54. A solenoid operated valve 56 is disposed in the conduit 54 and is closed during the aforesaid acceleration period. When the valve 56 is opened, fuel flows from the pump discharge conduit 54 into the combustion chamber inlet conduit 24. However, when the valve 56 is closed as shown in Fig. 1, the fuel in the pump discharge conduit 54 is forced to flow through a return conduit 58 to the pump inlet conduit 52. A valve 60 is disposed in the return conduit 58 and is normally closed by spring pressure aided by fluid pressure introduced thereto through a conduit 62 extending from the fuel inlet conduit 24. Thus, during the acceleration period, the turbo pump 50 is motor driven and the fuel is re-circulated and not introduced to the combustion chamber. Only air is introduced to the combustion chamber 14 during the acceleration period and will not exceed a pressure determined by a relief valve or dump valve 64 communicating with the air conduit 32.

At the end of the acceleration period, the motor 38 is deenergized as will be described, but the energy of the flywheel 42 and the other rotating elements causes the motor drive shaft 40 and the turbine shaft 46 to continue to rotate so as to sustain operation of the turbine pump 50. Also at the end of the timed acceleration period, the solenoid operated valve 56 is automatically opened so that fuel will be introduced to the combustion chamber 14 through the fuel inlet line 24. Then, responsive to fuel pressure in the fuel conduit 24 as will be described, the igniter 20 is energized to ignite fuel within the combustion chamber so as to create gases of combustion which will propel the starter turbine 26. A relatively small portion of the gases of combustion is discharged from the combustion chamber 14 through a conduit 66 extending to the pump turbine 48 whereby the said combustion gases provide the propellant for the said pump turbine. Thus, the turbine driven pump 50 continues to operate to supply fuel to the combustion chamber after the motor 38 is de-energized and after the flywheel 42 has dissipated its energy. An upper limit of pressure is maintained in the fuel conduit 24 by providing a relief valve 68 communicating therewith and adapted to open at a preselected figure to discharge fuel from the conduit 24 and return it to the fuel inlet conduit 52 through a return conduit 70.

The increase in combustion chamber pressure will close the check valve 36 in the air blower line before the flywheel 42 has dissipated all of its stored energy and before the blower 34 ceases to operate. When the check valve 36 is closed, all of the air from the blower 34 is discharged through the relief valve or dump valve 64. A high and low pressure operated switch mechanism indicated generally at 72 is employed to communicate with the fuel line 24 so as to be responsive to pressure therein. At a relatively low pressure, as may occur after the valve 56 is opened and fuel is introduced to the combustion chamber 14, the switch 72 or a low pressure portion thereof is actuated to energize the igniter 20 whereby to initiate burning as previously mentioned. After burning has taken place and the gases of combustion have created a relatively high pressure in the fuel line 24, the switch 72 or a high pressure portion thereof may be actuated to maintain the valve solenoid energized thereby to continue the fuel supply as will be described in greater detail hereinafter.

The electrical control system for the aforedescribed mechanical elements may include two leads L1 and L2 connected with the power source of an aircraft or the like. The control system is energized and the starter commences a cycle of operation when a start button 74 is closed. When the start button or switch 74 is manually closed, a power circuit between the leads L1 and L2 is closed to energize a timer motor 76. The timer motor 76 is used to drive two timing cams 78 and 80 which are associated with switches in the control circuit as will be described. The drive connection between the timer motor 76 and the cams 78 and 80 is indicated schematically in Figs. 1 and 2 by the broken lines 77,77. Closing the start switch 74 also energizes a relay 82 which is connected through a normally closed switch 84 forming a part of the low pressure portion of the pressure responsive switch structure 72.

When the relay 82 is energized, a normally open switch 86 forming a part thereof is closed in a circuit which includes a relay coil 88. The last mentioned circuit also includes a cam-operated switch 90, the switch 90 being operated by the cam 78. The motor 76 and cam 78 are so arranged that the switch 90 will be closed at the end of a selected interval (for example, one-half second) after the start switch 74 is closed. Closing of the switch 90 completes the circuit to the relay coil 88 whereby the coil-operated normally open switches 92 and 94 are closed. When the switch 94 is closed, a power circuit is completed to a relay coil 96 through normally closed switches 98 and 100 and through a normally closed switch 106 which is cam operated. Closing of the switch 94 also completes a power circuit through the closed switches 98 and 100 to a holding coil 97 which retains the start switch 74 in closed position. The relay coil 96 when energized closes a switch 104 in a power circuit which includes the blower motor 38. Thus, at the end of a selected interval (one-half second in the example given) after the manual start switch 74 is closed, the blower motor 38 is energized.

As previously described, the motor 38 drives the blower 34 to purge the combustion chamber 14 during a period of acceleration of known duration. Near the end of the acceleration period, the cam 80 driven by the timer motor 76 opens the switch 106 in circuit with the blower motor coil 96 and closes the said switch 106 in series with the solenoid coil 108 in the valve 56. Thus, the blower motor 38 is de-energized when the fuel valve 56 is opened. The circuit to the solenoid coil 108 also includes the closed switches 94, 98, and 100. When the coil 108 is energized, the valve 56 is opened to admit fuel from the turbine driven pump 50 to the combustion chamber 14. When the fuel pressure in the combustion chamber 14 and fuel line 24 reaches a preselected level, the low pressure side of the pressure responsive switch structure 72 is actuated to open the switch 84 thereby de-energizing the relay coil 82 and to close a circuit through a contact 110 which circuit includes the closed switch 92 and the igniter or spark plug 20.

An electrical time delay is incorporated in the switch 86 so that when the relay coil 82 is de-energized a time delay period of known duration, for example, approximately $2/10$ seconds, will ensue before the switch 86 opens to de-energize the relay coil 88. When the relay coil 88 is de-energized, the switch 92 is opened to de-energize the igniter or spark plug 20 and the switch 94 is opened.

During the aforesaid time delay period, combustion will occur and pressure within the combustion chamber 14 and the fuel line 24 will have reached a relatively high level. At the said relatively high pressure level, the high pressure side of the pressure responsive switch mechanism 72 will be actuated to close a normally open switch 112. The switch 112 when closed will complete a second circuit to the valve coil 108 to keep the said coil energized and the valve open for fuel flow to the combustion chamber 14. If the high pressure portion of the switch mechanism 72 fails to operate (if no combustion takes place) the opening of switch 94 at the end of the time delay causes the fuel control valve 56 to close and the start switch holding coil 97 will be de-energized to open or de-energize all of the control circuits.

At this point in the operation of the starter, assuming that combustion has started and that the high pressure switch has operated as described, only the circuits through the timer motor 76 and the valve coil 108 are closed in addition to the start switch holding coil circuit, and the blower and turbo pump motor 38 is de-energized. However, the fuel pump 50 will continue to operate on flywheel energy. Thus, fuel will continue to burn in the combustion chamber 14 to operate the starter 10 so as to commence engine operation, and part of the combustion gases pass through the conduit 66 to propel the turbine 48 to continue to drive the fuel pump 50 after the flywheel energy is dissipated.

The normaly closed switches 98 and 100 in the power circuit to the valve coil 108 are opened responsive to speed of the drive shaft 30 and the turbine 26, respectively. That is, when the drive shaft 30 reaches a predetermined speed at which engine operation should be self-sustaining, the switch 98 is automatically opened to de-energize the valve coil 108 whereupon the valve 56 will close to prevent further fuel flow to the combustion chamber. The start switch holding coil 97 will also be de-energized to permit the start switch 74 to open thereby de-energizing the entire electrical control system. The switch 100 which is responsive to speed of the turbine 26 is connected in series with the switch 98 for the same purpose and constitutes a safety switch operable in the event the switch 98 fails. Thus, the entire electrical control system and the starter are de-energized when the starter output reaches a speed at which engine operation will be self-sustaining.

In the event that the fuel fails to ignite when the igniter or spark plug 20 is energized, there will be no increase in fuel and combustion chamber pressure sufficient to close the switch 112 on the high pressure side of the pressure responsive switch mechanism 72. However, the pressure will be sufficient to open the low pressure responsive switch 84 thereby de-energizing relay coil 82 and opening switch 86 to de-energize relay coil 88 which will open switches 92 and 94. When the switch 94 opens with the switch 112 still in the open position, the valve coil 108 will be de-energized to close the valve 56 and the holding coil 97 will be de-energized whereupon the start switch 74 will open to shut off the entire electrical control system. Accordingly, there can be no undesirable fuel flow or other malfunction of the starter control system in the event that combustion does not occur.

In Fig. 2 of the drawings, there is shown an alternative control circuit for operation of the gas generator and starter apparatus shown in Fig. 1. The circuit of Fig. 2 is similar to that of Fig. 1, like elements performing the same function being similarly identified. The only essential difference is that different means are provided for de-energizing the blower motor 38.

More specifically, in the alternative control, switch actuating means A responsive to speed of the blower motor 38 is provided to open a normally closed switch 120 connected in circuit with the blower motor coil 96. At a selected speed of motor operation, at or near the end of the acceleration period, the actuator opens the switch 120 to de-energize the blower motor so that further blower operation results from flywheel energy. It will be seen that the switch 120 also serves to prevent overspeeding of the blower motor.

In the alternative control circuit, the blower motor coil 96 is energized in the same manner, but is connected in parallel with the start switch holding coil 97.

As previously mentioned, the gas generator as used here to drive an engine starting apparatus can be used in association with a wide variety of other elements in power producing units. In some of the alternative uses and applications of the generator, it may be desirable to use other than spark means for igniting the fuel and various other modifications can be effected. For example, if the generator is used as part of a power package for short life or duration devices such as guided missiles, there may be no requirement for terminating combustion until the fuel supply is exhausted. In such modification, it is only necessary to remove the switches 98 and 100 from the control system.

It should be understood that other modifications can be effected within the scope of the invention as defined in the appended claims.

The invention claimed is:

1. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with the said outlet, a drive motor having a releasable driving connection with said pump turbine, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means and for de-energizing said motor, first switch means responsive to fuel pressure in said fuel conduit to energize said igniter and to actuate said time delay switch means which is operable to de-energize said igniter, and switch means responsive to operation of the starter for de-energizing said electrically operable means.

2. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with said outlet, a drive motor having a releasable driving connection with said pump turbine, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means and for de-energizing said motor, first pressure responsive switch means responsive to fuel pressure to energize said igniter and to actuate said time delay switch means which is operable to de-energize said igniter and to de-energize said electrically operable means, second pressure responsive switch means responsive to combustion pressure during the time delay to maintain the energized condition of said electrically operable means, and means responsive to starter operation for de-energizing the electrically operable means.

3. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with said outlet, a drive motor having a releasable driving connection with said pump turbine, said releasable driving connection including a flywheel adapted to continue operation of the pump turbine after said motor is operated and then de-energized, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means and for de-energizing said motor, first switch means responsive to fuel pressure in said fuel conduit to energize said igniter and to actuate said time delay switch means which is operable to de-energize said igniter, and switch means responsive to operation of the starter for de-energizing said electrically operable means.

4. In a starter for an aircraft engine or the like, the combination comprising a housing defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with said outlet, a drive motor having a releasable driving connection with said pump turbine, said releasable driving connection including a flywheel adapted to continue operation of the pump turbine after said motor is operated and then de-energized, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means and for de-energizing said motor, first pressure responsive switch means responsive to fuel pressure to energize said igniter and to actuate said time delay switch means which is operable to de-energize said igniter and to de-energize said electrically operable means, second pressure responsive switch means responsive to combustion pressure during the time delay to maintain the energized condition of the said electrically operable means, and means responsive to starter operation to de-energize the electrically operable means.

5. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with said outlet, a drive motor having a releasable driving connection with said pump turbine, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means, first pressure responsive switch means responsive to fuel pressure to energize said igniter and to actuate said time delay switch means which is operable to de-energize said igniter, switch means responsive to operation of said motor at a preselected speed to de-energize said motor, and means responsive to starter operation to de-energize said electrically operable means.

6. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with said outlet, a drive motor having a releasable driving connection with said pump turbine, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means, first pressure responsive switch means responsive to fuel pressure to energize said igniter and to actuate said time delay switch means which is operable to de-energize said igniter, switch means responsive to operation of said motor at a preselected speed to de-energize said motor, second pressure responsive switch means responsive to combustion pressure during the time delay to maintain the energized condition of said electrically operable means, and means responsive to starter operation to de-energize said electrically operable means.

7. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with the said outlet, a drive motor having a releasable driving connection with said pump turbine, said releasable driving connection including a flywheel adapted to continue operation of the pump turbine after said motor is operated and then de-energized, and control means for said starter connectible with a source of electrical energy and including a timer and time delay switch means, means for energizing said motor, first timer-operated switch means for energizing said motor, second timer-operated switch means operable after said first timer-operated switch means for energizing said electrically operable means, first pressure responsive switch means responsive to fuel under pressure to energize said igniter and to actuate said time delay switch means which is operable to de-energize said igniter, switch means responsive to operation of said motor at a preselected speed to de-energize said motor, and means responsive to starter operation to de-energize said electrically operable means.

8. In a starter for an aircraft engine or the like, the combination comprising housing means defining a combustion chamber and a turbine chamber, the said combustion chamber having a fuel inlet and a gas outlet and the said turbine chamber having a propellant inlet communicating with the combustion chamber and also having a propellant discharge opening, a starter turbine disposed in said turbine chamber, an igniter disposed in said combustion chamber, a fuel pump having a discharge conduit connected with the combustion chamber inlet, a normally closed valve in the fuel conduit, electrically operable means for opening said valve, a fuel pump turbine having a propellant conduit connected with said outlet, a drive motor having a releasable driving connection with said pump turbine, said releasable driving connection including a flywheel adapted to continue operation of the pump turbine after said motor is operated and then de-energized, and control means for said starter connectible with a source of electrical energy and including a timer and time delay switch means, means for energizing said timer, first timer-operated switch means for energizing said motor, second timer-operated switch means operable after said first timer-operated switch means for energizing said electrically operable means, first pressure responsive switch means responsive to fuel pressure to energize said igniter and to actuate said time delay switch means which is operable to de-energize said igniter, switch means responsive to operation of said motor at a preselected speed to de-energize said motor, second pressure responsive switch means responsive to combustion pressure during the time delay to maintain the energized condition of said electrically operable means, and means responsive to starter operation to de-energize said electrically operable means.

References Cited in the file of this patent

UNITED STATES PATENTS

| | | |
|---|---|---|
| 2,669,092 | Hammaren | Feb. 16, 1954 |
| 2,689,454 | Schneider | Sept. 21, 1954 |
| 2,733,569 | Trowbridge | Feb. 7, 1956 |

FOREIGN PATENTS

| | | |
|---|---|---|
| 155,773 | Australia | Mar. 19, 1954 |
| 200,836 | Australia | Feb. 2, 1956 |
| 590,418 | Great Britain | July 17, 1947 |
| 700,922 | Great Britain | Dec. 16, 1953 |